No. 746,257. PATENTED DEC. 8, 1903.
R. BAGGALEY.
APPARATUS FOR PRECIPITATING INJURIOUS FUMES FROM SMELTER GASES.
APPLICATION FILED AUG. 25, 1903.
NO MODEL. 3 SHEETS—SHEET 3.
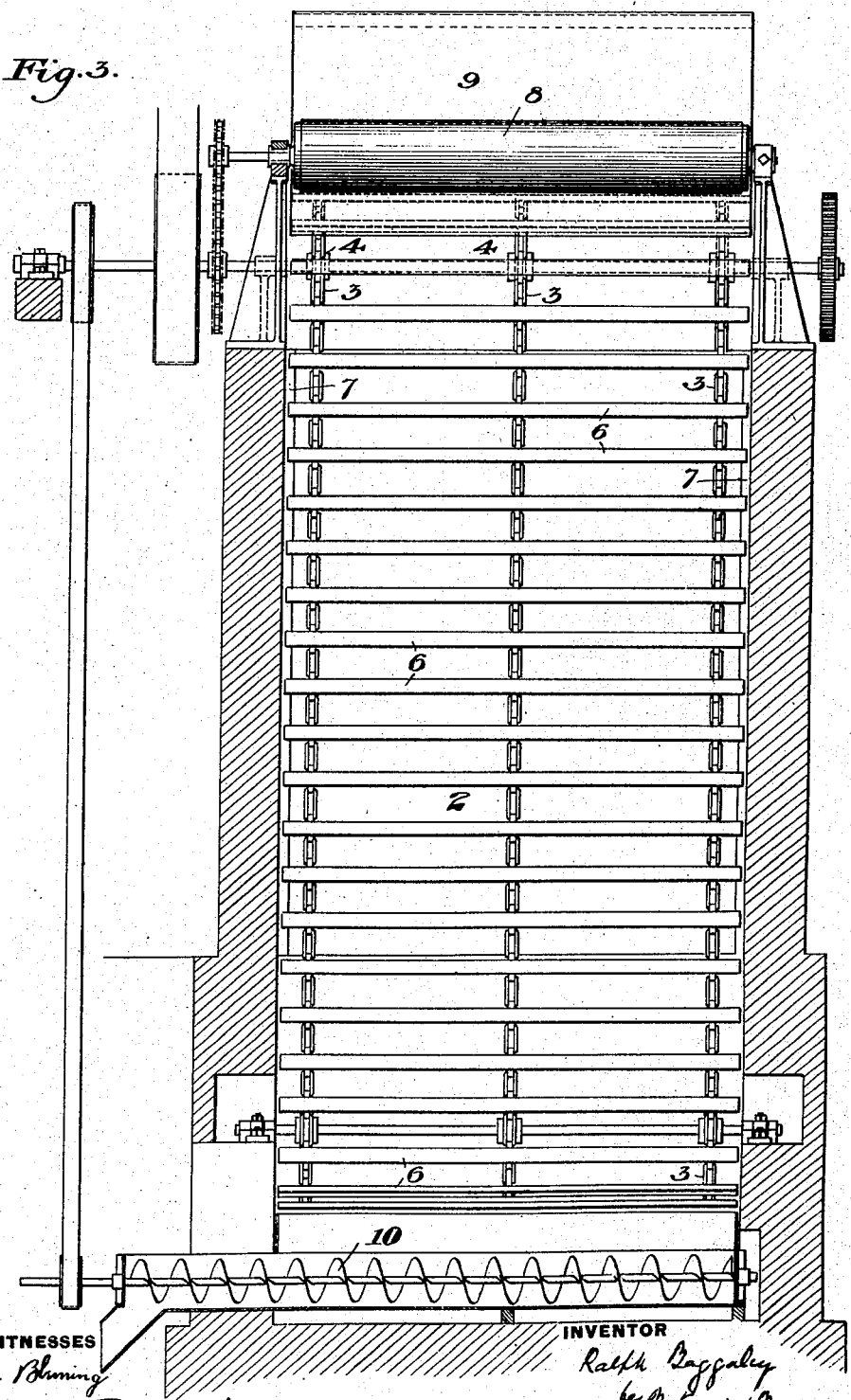

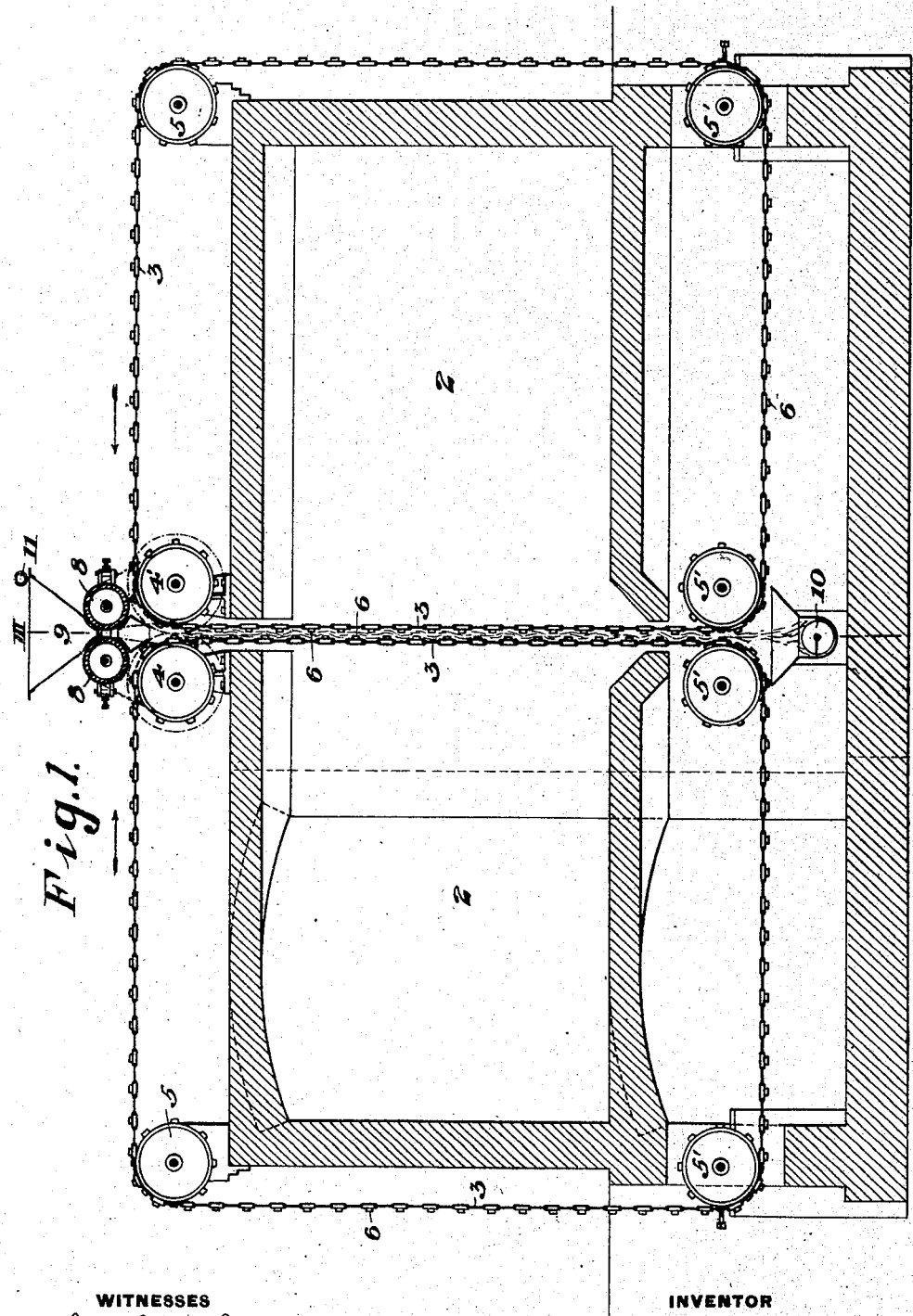

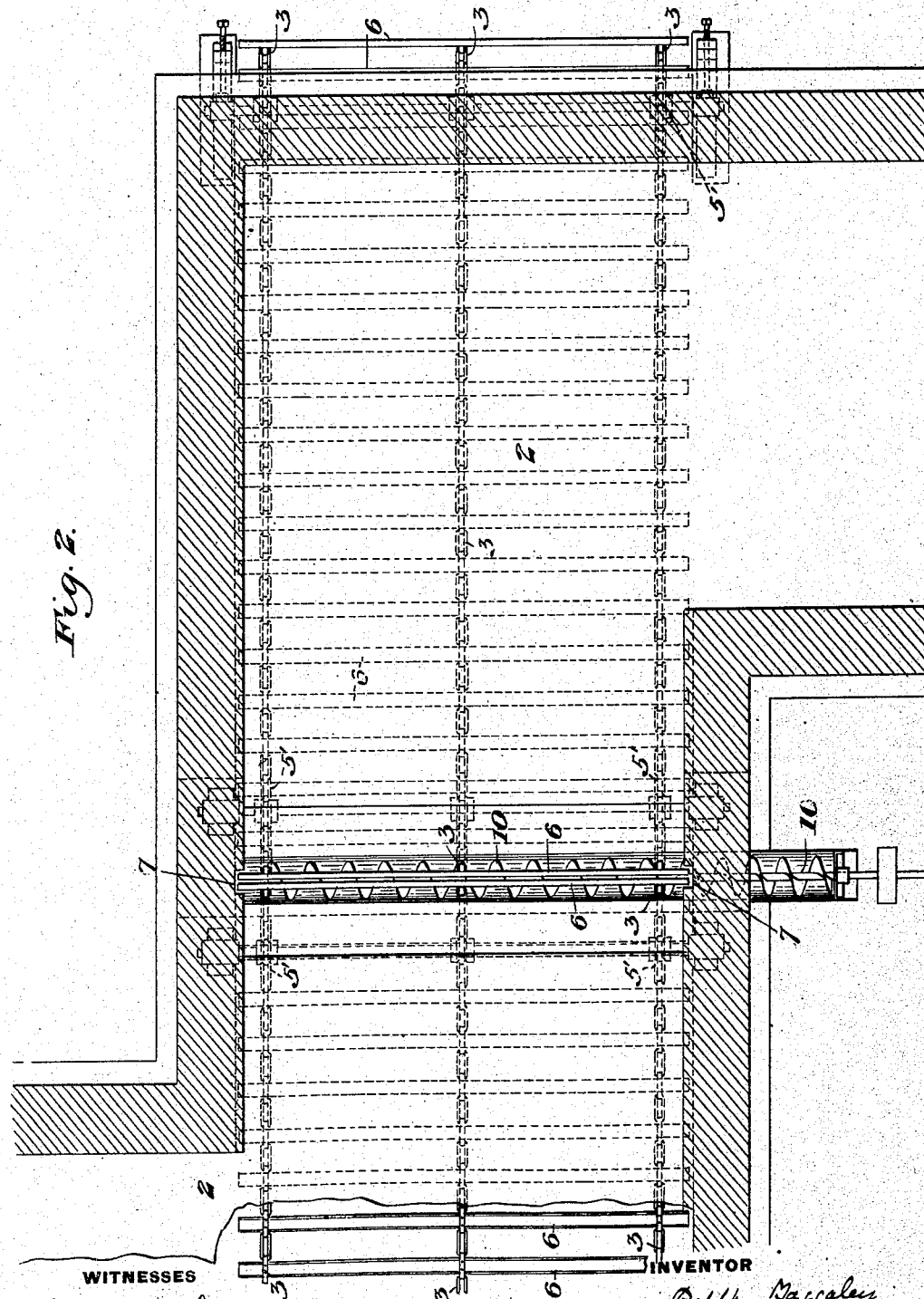

No. 746,257.

Patented December 8, 1903.

UNITED STATES PATENT OFFICE.

RALPH BAGGALEY, OF PITTSBURG, PENNSYLVANIA.

APPARATUS FOR PRECIPITATING INJURIOUS FUMES FROM SMELTER-GASES.

SPECIFICATION forming part of Letters Patent No. 746,257, dated December 8, 1903.

Application filed August 25, 1903. Serial No. 170,726. (No model.)

*To all whom it may concern:*

Be it known that I, RALPH BAGGALEY, of Pittsburg, Allegheny county, Pennsylvania, have invented a new and useful Apparatus for Precipitating Injurious Fumes from Smelter-Gases, of which the following is a full, clear, and exact description, reference being had to the accompanying drawings, forming part of this specification, in which—

Figure 1 is a vertical section of my apparatus. Fig. 2 is a plan view thereof, and Fig. 3 is a cross-section on the line III III of Fig. 1.

My invention relates to an apparatus whereby the obnoxious and injurious gases contained in the fumes from smelters may be precipitated with the greatest economy, utilizing as filters and precipitating surfaces vegetable growth of the most abundant and cheapest form at the point where the smelting plant may be located.

By interposing one or more filtering-surfaces that are constantly kept moist in the flue of a smelting-furnace subject to the draft of the ordinary stack or an induced draft the free sulfur, sulfur dioxid, a portion of the arsenic, together with the antimony, lead, &c., will be precipitated on such surfaces, and the fumes from the smelting process may thereafter be allowed to escape into the atmosphere without injury to vegetation and without polluting the waters of the district.

In order to arrest and precipitate all of the arsenic contained in the fumes, it will be necessary to use an alkaline solution or a dilute solution of sulfid of calcium on at least one or more of the filtering-screens located in the flue between the furnace and the stack or between the furnace and the induced draft. It is preferably used on all of such screens, although a large proportion of the contained arsenic will be mechanically precipitated, together with the sulfur, iron, antimony, &c., by using water alone on the screens.

The substance utilized in practicing my invention will be regulated by conditions at various points. Thus when a smelter is located at or near the sea coast—for instance, on Puget Sound, where vast quantities of kelp or seaweed are available—this material may be utilized to advantage, inasmuch as it is cheap, contains moisture within itself, and it is strongly alkaline. At inland points bagasse, straw, hay, cornstalks, swamp-grasses, rushes, willows, mosses, the boughs of trees and shrubs, particularly of the *Conifera* family, as well as some varieties of the cactus, may be utilized. In the latter case, however, it will be necessary to supply abundant water or alkaline solution into the hoppers with the material, and in addition to this it will usually be necessary to supply water by means of pipes, jets, &c., to the central and to the lower portions of such screens, inasmuch as the hot gases will otherwise quickly dry at least some portion of the screens, and thus render such dried portion of each screen inoperative.

In an ordinary smelting-furnace having a capacity of three hundred and sixty tons of ore in twenty-four hours and which ore may contain twenty per centum of sulfur it will be necessary to precipitate from the fumes in each twenty-four hours at least from fifty to seventy-five tons of impurities, according to the character of the ore under treatment. Over one-fifth ($\frac{1}{5}$) of these three hundred and sixty tons every day will be expelled in the form of sublimated metals or metalloids. It is probable that such a furnace will sometimes thus throw off in gases a total of one hundred tons in twenty-four hours, or approximately four tons per hour, or one ton in every fifteen minutes, or, say, one hundred pounds per minute. The necessity of screens or precipitating-surfaces actuated solely by machinery will thus be apparent to those skilled in the art.

From one to five tons of straw or other such material will be ample to provide the requisite condensing-surfaces each twenty-four hours, according to the percentages of contained impurities in the ore under treatment, and the economy of this process will therefore be apparent. It is also of the utmost importance as a measure of economy that any handling of the material be avoided and that such work be accomplished entirely, or nearly so, by machinery. The only manual labor required in operating my apparatus consists in delivering the vegetable fiber at the ground level into the conveyer that elevates and then delivers it to the hopper above the rollers, whence it passes downward in the form of a wet mat into the mechanism that supports it and that carries it slowly downward through the furnace-flue in order that it may receive its proportion of the sublimated gases in its passage to the conveyer below the flue which delivers it on to the railroad-car or other suitable receptacle for removal.

In the drawings, 2 represents a chamber interposed in the flue leading from a copper-smelter and connected with a stack or exhaust-fan for the purpose of causing the smelter-gases to move freely therethrough. In this chamber is a moving screen or series of screens, each of which is preferably constituted as follows: 3 3 are endless chains which extend vertically through the chamber and in opposite directions around the exterior thereof and pass around sprocket-wheels 4 4' 5 5', the sprocket-wheels 4 4' being driven by suitable gear. The inner branches of the chains which pass through the furnace are adjacent and parallel and are fitted with horizontal cross-bars 6 6, between which the vegetable fiber is grasped and carried. They are best made of channel-bars, and at their ends travel in vertical grooves 7 7 in the walls of the chambers, so that the entire width of the chamber will be taken up with the screen, and gases cannot leak past its edges. At the points where the cross-bars are fixed to the chain filler-blocks are preferably used in the channels and the chains are so placed on the sprocket-wheels that the bars of each chain will alternate in position.

Above the sprocket-wheels 4 4' are feed-rollers 8 8, surmounted by a hopper 9, through which the screen material is delivered to the chains, and at the base of the chains there is a conveyer 10, which may be a screw conveyer, by which the material is removed and delivered to cars.

At the place where the chains pass through the floor of the chamber 2 this floor has a sloping or hopper-like construction, which catches and holds any loose vegetable fiber which may have been disengaged from the screen. As the screen, burdened with impurities, passes out of this opening it carries with it this loose vegetable fiber to the conveyer. The chains thus constitute chain-racks, and when the material is delivered to them by the feed-rollers they carry it in the form of a mat or screen downwardly through the chamber and across the path of the gases, which deposit their impurities therein. Water is supplied to the mat from a pipe 11 or otherwise.

Without departing from the spirit of my invention the feeding and forming rollers above described may be dispensed with and the vegetable fiber mat be fed from the hopper directly into the chain-racks intended to compress, support, and propel it. I, however, prefer to use the upper forming-rollers as supplementary to the chain-racks, because by their use I am enabled to catch the loose vegetable fiber as it is delivered by the conveyer-elevator to the hopper and to form it by means of compression, thus giving it a desirable, mat-like or screen-like form before it enters the chain-rack mechanism. Through the use of the rolls, conveyer, and hopper I am also enabled to spread the vegetable fiber, so as to form a mat or screen of any desired width. In this way I am able to force the screen to engage the side walls firmly in its passage downward through the flue and thus to prevent the escape of gases past the sides or edges of the screen without first precipitating their burden of contained metals or metalloids upon the screen in their flight to the stack and through the latter to the atmosphere.

My apparatus furnishes a moistened vegetable fiber screen propelled by machinery through the flue in order to arrest all obnoxious and injurious substances contained in the gases and is so designed as to make it impossible for such materials to be precipitated on any surface excepting on the screens themselves that are especially designed for the reception of and the cheap removal of the same. The mechanism renders unnecessary flue-walls for guiding and containing the screen, as the chains themselves hold and carry the screen material. The evils which would arise from the deposit of incrustation on such walls are thus avoided.

The invention enables the use of chains of cheap standard construction that are not readily affected by the furnace-fumes.

I have not shown in the drawings the many modifications that may be made in the apparatus to suit the various materials that may be available at various points. Within the broad scope of my invention all such are intended to be included, since

What I claim is—

1. Apparatus for removing impurities from gases, comprising a chamber, a moving rack in the chamber unconfined by walls at its sides, and screen material carried by the rack; substantially as described.

2. Apparatus for removing impurities from gases, comprising a chamber, a traveling rack composed of adjacent chains or ropes, and screen material carried thereby; substantially as described.

3. Apparatus for removing impurities from gases, comprising a chamber, a traveling rack composed of adjacent chains or ropes having cross-bars, and screen material carried thereby; substantially as described.

4. Apparatus for removing impurities from gases, comprising a chamber, a traveling rack composed of adjacent chains or ropes having alternately-arranged cross-bars, and screen material carried thereby; substantially as described.

5. Apparatus for removing impurities from gases, comprising a chamber, chains or ropes passing through and oppositely around the chamber, and screen material carried thereby; substantially as described.

6. Apparatus for removing impurities from gases, comprising a chamber, a traveling screen-carrier passing through the chamber, a hopper-shape opening at the exit of the carrier, and screen material carried by the carrier; substantially as described.

7. Apparatus for removing impurities from gases, comprising a chamber, a traveling rack composed of adjacent chains or ropes, feeding and forming rollers above the same, and screen material carried between the chains or ropes; substantially as described.

8. Apparatus for removing impurities from gases, comprising a chamber, a traveling rack composed of adjacent chains or ropes, a hopper above the same, and screen material carried between the chains or ropes; substantially as described.

9. Apparatus for removing impurities from gases, comprising a chamber, a traveling rack unconfined by walls at its sides, screen material carried by the rack, and means for supplying water to said material; substantially as described.

In testimony whereof I have hereunto set my hand.

RALPH BAGGALEY.

Witnesses:
WILLIAM M. KIRKPATRICK,
W. D. KYLE.